United States Patent
Nguyen

(10) Patent No.: US 11,920,451 B1
(45) Date of Patent: Mar. 5, 2024

(54) PLUG VALVES FOR FRACTURING SYSTEMS

(71) Applicant: Cantex International, Inc., Houston, TX (US)

(72) Inventor: Duy D. Nguyen, Cypress, TX (US)

(73) Assignee: Cantex International, Inc., Houston, TX (US)

( * ) Notice: Subject to any disclaimer, the term of this patent is extended or adjusted under 35 U.S.C. 154(b) by 0 days.

(21) Appl. No.: 18/126,922

(22) Filed: Mar. 27, 2023

(51) Int. Cl.
*E21B 43/26* (2006.01)
*F16K 5/04* (2006.01)

(52) U.S. Cl.
CPC ........ *E21B 43/2607* (2020.05); *F16K 5/0442* (2013.01); *F16K 5/0471* (2013.01); *E21B 2200/04* (2020.05)

(58) Field of Classification Search
CPC ............. E21B 43/2607; E21B 2200/04; F16K 5/0442; F16K 5/0471
See application file for complete search history.

(56) References Cited

U.S. PATENT DOCUMENTS

| | | | |
|---|---|---|---|
| 2,488,932 A | 11/1949 | Penick | |
| 2,911,187 A | 11/1959 | Owsley | |
| 2,997,057 A * | 8/1961 | Toth | F16K 5/0471 137/454.2 |
| 3,160,387 A | 12/1964 | Windsor | |
| 3,357,679 A | 12/1967 | Gulick | |
| 3,760,833 A | 9/1973 | Kemp et al. | |
| 4,577,662 A | 3/1986 | Doremus | |
| 6,675,825 B1 | 1/2004 | Reeves et al. | |
| 8,061,687 B2 | 11/2011 | Anderson | |
| 9,103,448 B2 | 8/2015 | Witkowski et al. | |
| 2003/0151016 A1* | 8/2003 | Neal | F16K 5/0492 251/309 |
| 2014/0048734 A1* | 2/2014 | Witkowski | F16K 5/0457 29/890.122 |

(Continued)

FOREIGN PATENT DOCUMENTS

| | | |
|---|---|---|
| CN | 2010-20675188.7 U | 12/2010 |
| CN | 2018-84700 U | 6/2011 |

OTHER PUBLICATIONS

Australian Pipeline Valve, *Plug Valves: Lubricated, Sleeved, Lined* (1990-2021).

(Continued)

*Primary Examiner* — James G Sayre
(74) *Attorney, Agent, or Firm* — Keith B. Willhelm

(57) ABSTRACT

A plug valve for controlling flow through high-pressure fluid flow lines has a valve chamber and a rotatable valve body. The chamber has an undercut. First and second valve seat inserts are mounted in the chamber undercut. The valve body has a midsection, a flow port extending through the midsection, a passage extending between an upper surface and a lower surface of the midsection, an upper valve stem extending from the midsection upper surface, and a lower valve stem extending from the midsection lower surface. The upper surfaces of the valve body exposed to internal fluid pressure and lower surfaces of the valve body exposed to internal fluid pressure have substantially equal surface areas. First and second plug seal rings having substantially equal diameters are mounted, respectively around the upper valve stem and the lower valve stem.

26 Claims, 8 Drawing Sheets

(56) References Cited

U.S. PATENT DOCUMENTS

| | | | |
|---|---|---|---|
| 2014/0252260 A1* | 9/2014 | Woods | F16D 3/04 |
| | | | 251/309 |
| 2017/0370480 A1* | 12/2017 | Witkowski | B01F 27/05 |
| 2018/0073654 A1* | 3/2018 | Nowell | F16K 27/065 |
| 2023/0119815 A1* | 4/2023 | McPhail | F16K 5/225 |
| | | | 251/309 |

OTHER PUBLICATIONS

Cameron, *Flow Iron Plug Valves* (2020).
Dixie Iron Works, Ltd./MSI, *3:16 Safe-Weight Valve* (downloadable at https://www.diwmsi.com/solutions/3-16/?doing_wp_cron=1679150863.5669229030609130859375).
Dynamic Balance Plug Valve.
Process Valve Corp., *Nordstrom Dynamic Balanced Plug Valve* (2017).
TechnipFMC, *Flowline Products and Services* (2018).
TSI Flow Products, *Plug Valves* (2021).

\* cited by examiner

PLUG VALVES FOR FRACTURING SYSTEMS

FIELD OF THE INVENTION

The present invention relates generally to plug valves, and especially to plug valves for fluid transportation systems conveying particulate-laden, corrosive fluids under high pressure and flow rates as are common, for example, in the oil and gas industry.

BACKGROUND OF THE INVENTION

Hydrocarbons, such as oil and gas, may be recovered from various types of subsurface geological formations. The formations typically consist of a porous layer, such as limestone and sands, overlaid by a nonporous layer. Hydrocarbons cannot rise through the nonporous layer. Thus, the porous layer forms a reservoir, that is, a volume in which hydrocarbons accumulate. A well is drilled through the earth until the hydrocarbon bearing formation is reached. Hydrocarbons then can flow from the porous formation into the well.

Hydrocarbons, however, are not always able to flow easily from a formation to a well. Some subsurface formations, such as sandstone, are very porous. Hydrocarbons can flow easily from the formation into a well. Other formations, however, such as shale rock, limestone, and coal beds, are only minimally porous. The formation may contain large quantities of hydrocarbons, but production from the well may not be commercially viable because hydrocarbons flow though the formation and collect in the well at very low rates. The industry, therefore, relies on various techniques for improving the well and stimulating production from formations. In particular, various techniques are available for increasing production from formations which are relatively nonporous, often referred to as "tight" formations.

Perhaps the most important stimulation technique is the combination of horizontal wellbores and hydraulic fracturing. A well will be drilled vertically until it approaches a formation. It then will be diverted, and drilled in a more or less horizontal direction, so that the borehole extends along the formation instead of passing through it. More of the formation is exposed to the borehole, and the average distance hydrocarbons must flow to reach the well is decreased. Fractures then are created in the formation which allow hydrocarbons to flow out of the formation more easily.

Fracturing a formation is accomplished by pumping fluid, most commonly water, into the well at high pressure and flow rates. Proppants, such as grains of sand, ceramic or other particulates, usually are added to the fluid along with gelling agents to create a slurry. The slurry is forced into the formation at rates faster than can be accepted by the existing pores, fractures, faults, vugs, caverns, or other spaces within the formation. Pressure builds rapidly to the point where the formation fails and begins to fracture. Continued pumping of fluid into the formation will tend to cause the initial fractures to widen and extend further away from the wellbore, creating flow paths to the well. The proppant serves to prevent fractures from closing when pumping is stopped.

Given the length of typical wellbores, a formation rarely will be fractured all at once. It typically will be fractured in many different locations or zones and in many different stages. Fluids will be pumped into the well to fracture the formation in a first zone. After the initial zone is fractured, pumping is stopped, and a plug is installed in the liner at a point above the fractured zone. Pumping is resumed, and fluids are pumped into the well to fracture the formation in a second zone located above the plug. That process is repeated for zones further up the wellbore until the formation has been completely fractured.

Once the well is fractured, the large quantities of water and sand that were injected into the formation must be allowed to flow out of the well. The water and sand will be separated from hydrocarbons produced by the well to protect downstream equipment from damage and corrosion. The production stream also may require additional processing to neutralize corrosive agents in the stream.

The pressures and flow rates required to fracture typical oil and gas wells are extremely high: pressures up to 20,000 psi and flow rates up to 100 bbl/minute. Such pressures and rates greatly exceed the capacity of any single frac pump. The cumulative output of many frac pumps, therefore, is required to reach the required pressures and flow rates. High pressure conduits must be assembled to convey fluid from the array of pumps ultimately into a single well.

Systems for successfully completing a fracturing operation, therefore, are extensive and complex, as may be appreciated from FIG. 1. FIG. 1 illustrates schematically a conventional frac system 24. Water from tanks 1 and gelling agents dispensed by a chemical unit 2 are mixed in a hydration unit 3. The discharge from hydration unit 3, along with sand carried on conveyors 4 from sand tanks 5 is fed into a blending unit 6. Blender 6 mixes the gelled water and sand into a slurry. The slurry is discharged through low-pressure hoses 7 which convey it into two or more low-pressure lines 8 in a frac manifold 9. The low-pressure lines 8 in frac manifold 9 feed the slurry to an array of pumps 10, perhaps as many as a dozen or more, through low-pressure "suction" hoses 11. Pumps 10 take the slurry and discharge it at high pressure through individual high-pressure "discharge" lines 12 into a "missile" 13 on frac manifold 9.

Frac systems typically are designed to deliver flow to multiple well heads. Frac system 24, for example, incorporated a zipper manifold 16. The combined flow from missile 13 on frac manifold 9 is fed through a high-pressure line 14 running to a junction head of zipper manifold 16 (sometimes also referred to as a "frac manifold"). Zipper manifold 16 is designed to deliver flow to three well heads 19 via flow lines 17. Valves 18 are provided in zipper flow lines 17 so that the frac slurry may be selectively diverted to one of the well heads 19. Once fracturing is complete, flow back from the fracturing operation discharges into a flowback manifold 20 which leads into flowback tanks 21. Valves 18 then will be operated to divert frac fluid into the other well head 19 to frac that well.

Valves 18 in flow lines 17 of zipper manifold 16 typically are shut-off valves. They either allow full flow through lines 17 or completely shut off flow. One type of shut-off valve used in frac systems is plug valves. Plug valves provide relatively quick actuation from an open to a shut-off position and vice versa. When properly designed, they also can handle flow of abrasive and corrosive fluids at high flow rates and pressures.

A common plug valve design comprises a valve housing, a valve body or "plug", and a pair of seat inserts. The valve housing provides a fluid inlet and a fluid outlet leading, respectively, into and out of a central valve chamber. The plug and seat inserts are mounted in the valve chamber. They may be installed and replaced as needed through an access bore in the valve housing. The access bore may be provided through the top or the bottom of the valve housing, thus a distinction is recognized between "top-loading" and "bottom-loading" plug valves. In either event, a threaded cap closes the access bore when the valve is fully assembled and when placed in service.

The midsection of the plug is cylindrical, or it may be provided with a slight taper. It has a bore, often referred to as flow port, that extends generally perpendicular to the primary axis of the plug. The plug bore typically is cylindrical and has a cross section generally equal to that of the valve inlet and outlet. Rotation of the plug or, more specifically, the orientation of its flow port will control flow through the valve.

That is, the seat inserts are mounted in the valve chamber on either side of the plug, one against the inlet and the other against the outlet. Passages in the seat inserts align with the inlet and outlet. The plug is mounted between the seat inserts for rotation about its primary axis. It may be rotated to align its flow port with the inlet and outlet. Fluid can flow through the valve. As their name implies, the seat inserts provide surfaces upon which the plug may seat. Thus, when the plug is rotated from its open position, typically 90°, the flow port in the plug moves out of alignment with the inlet and outlet. The plug will seat on the inserts and shut off flow through the valve.

Plug valves have much to commend them. As noted, they may be actuated relatively quickly, especially as compared to gate valves, another type of shut-off valve used in frac systems. The flow port in the plug may be sized to significantly reduce pressure drop through the valve. Plug valves also have relatively few parts as compared, for example, to ball valves. They may be cleaned and rebuilt without removing the valve from the system. More significantly, and unlike ball valves with which they share similarities, they are much better suited to high pressure applications. The cylindrical plug and seat inserts provide a relatively large metal-to-metal sealing area. Thus, they can provide an effective, leak-tight seal even under high pressures.

As appreciated by a comparison with ball valves, many features and design aspects that are well suited for other types of valves may be less suited, or not suitable at all for plug valves. The same is true for plug valves designed for low-pressure service. They may have design features that render them unsuitable for high-pressure systems, and especially for fluid systems, such as frac systems, that transport abrasive, often corrosive fluids at high flow rates.

The large sealing area and the minimal clearances between the plug and the seat inserts and other valve components of plug valves, for example, can create significant friction as the plug is rotated. Put simply, plug valves are harder to turn than valves that are designed for lower pressure service, such as ball valves. Moreover, the plug necessarily floats to a small, but significant degree within the valve chamber. When the valve is shut, and again especially in high-pressure applications, the plug will shift toward the downstream, low pressure seat insert. The plug thus can become "pressure locked" against the seat insert, making it difficult to initiate actuation of the valve. The breakout torque required to rotate the plug and reopen the valve, especially for larger plug valves, may be quite high. Such problems can be exacerbated by wear and corrosion caused by fluids flowing through the valve and by temperature fluctuations. Providing more force to actuate the valve may not always be a desirable option.

Moreover, plug valves and other frac iron are subjected to extremely harsh conditions. Given that they must be built to withstand flows of abrasive and corrosive fluids at high pressures and flow rates, preferably over an extended service life, they necessarily must be fabricated in large part from durable, high-tensile materials such as steel. Such materials are not only heavy, but expensive. Thus, reducing material costs and weight in plug valves designed for such harsh conditions can be a challenge.

The statements in this section are intended to provide background information related to the invention disclosed and claimed herein. Such information may or may not constitute prior art. It will be appreciated from the foregoing, however, that there remains a need for new and improved plug valves. More particularly, there is a great need for plug valves that are better suited for use in frac systems and other systems used to convey abrasive and corrosive fluids at high pressures and flow rates. Such disadvantages and others inherent in the prior art are addressed by various aspects and embodiments of the subject invention.

SUMMARY OF THE INVENTION

The subject invention, in its various aspects and embodiments, relates generally to plug valves designed for use in fluid transportation systems, such as systems for fracturing a well, that convey abrasive and corrosive fluids at high pressures and flow rates. The invention encompasses various embodiments and aspects, some of which are specifically described and illustrated herein.

One aspect of the invention provides for a plug valve adapted for controlling flow through high-pressure fluid flow lines. The plug valve comprises a housing, a cap, first and second seat inserts, and a valve body. The housing is adapted for assembly into a high-pressure flow line. It comprises first and second conduits, a generally cylindrical valve stem passage, a generally cylindrical access bore having a diameter, and a generally cylindrical chamber. The chamber communicates with the first and second conduits, the housing valve stem passage, and the access bore. The chamber is generally aligned axially with the housing valve stem passage and the access bore. It also has a diameter greater than the diameter of the access bore, thereby providing an annular undercut in the chamber.

The cap is threaded into the access bore. The cap has a valve stem passage and a main seal ring mounted between it and the access bore. The main seal has a diameter less than the diameter of the chamber. Each seat insert has the general shape of a lateral segment of an open cylinder and has a transverse passage. The seat inserts are mounted in the undercut of the chamber such that the transverse passage of the first seat insert aligns with the first conduit and the transverse passage of the second seat insert aligns with the second conduit.

The valve body is mounted in the housing valve stem passage, the chamber, and the cap valve stem passage for rotation about a primary axis. It has a generally cylindrical midsection. The midsection is adapted to seat on the seat inserts. The midsection has an upper annular surface and a lower annular surface which have substantially equal surface areas. The midsection also has a passage extending axially through the midsection from the upper annular surface to the lower annular surface.

The valve body also has upper and lower valve stems and first and second plug seal rings. The upper valve stem extends through the housing valve stem passage. The lower valve stem extends through the cap valve stem passage. The first plug seal ring is mounted between the upper valve stem and the housing valve stem passage. The second plug seal ring is between the lower valve stem and the cap valve stem passage. The first and second plug seal rings have substantially equal diameters.

The plug midsection also has a flow port. The flow port aligns with the seat insert passages and the conduits to allow flow through the valve when the valve body is rotated to an open position. The flow port is out of alignment with the seat insert passages and the conduits to shut off flow through the valve when the valve body is rotated to a closed position.

Other embodiments provide such plug valves where the plug valve has at least two filler inserts. Each insert has the general shape of a lateral segment of an open cylinder. The seat inserts are mounted in the undercut of the chamber between the first and second seat inserts such that the seat inserts and the filler inserts collectively define an open cylinder substantially occupying the chamber undercut.

Still other embodiments provide such plug valves where the filler inserts, when mounted in the undercut of the chamber along with the first and second seat inserts, provide vertical gaps between the filler inserts and the seat inserts.

Yet other embodiments provide such plugs where at least one of the filler inserts has a hole extending radially through the filler insert and a groove on its outer face. The groove extends at least from a point proximate a grease port in the housing to a point proximate an edge of a the seat insert.

Further embodiments provide such plug valves where the valve comprises first and second seat seal rings extending around the transverse passages in the seat inserts. The seat seal rings are mounted between an outer face of the seat inserts and a circumference of the chamber.

Other embodiments provide such plug valves where the seat seal rings are mounted between the outer faces of the seat inserts and a circumference of the undercut of the chamber.

Still other embodiments provide such plug valves where the plug valve has a mechanism for positioning the seat inserts in the undercut of the chamber such that their respective transverse passages align with the conduits.

Yet other embodiments provide such plug valves where the plug valve has pins mounted in the undercut of the chamber and the seat inserts comprise peripheral notches. The notches accommodate the pins. The pins and notches are located so as to align the transverse passages of the seat inserts with the conduits when the seat inserts are mounted in the undercut of the chamber.

Further embodiments provide such plug valves where the main seal ring is mounted in an annular gland provided in an unthreaded portion of the cap.

Other embodiments provide such plug valves where the cap has an outer rim providing a hard stop for the cap.

Yet other embodiments provide such plug valves where the housing valve stem passage has a first diameter portion adjacent the chamber and a second diameter portion adjacent the first diameter portion. The second diameter portion has a diameter less than that of the first diameter portion thereby providing a downward facing annular shoulder in the housing valve stem passage. The upper valve stem has a first diameter portion adjacent to the valve body midsection and a second diameter portion adjacent to the first diameter portion. The second diameter portion has a diameter less than that of the first diameter portion thereby providing an upward facing shoulder on the upper valve stem. The first seal ring is carried between the downward facing shoulder in the housing valve stem passage and the upward facing shoulder on the upper valve stem and between the first diameter portion of the housing valve stem passage and the second diameter portion of the upper valve stem. The cap valve stem passage has a first diameter portion adjacent the chamber and a second diameter portion adjacent the first diameter portion. The second diameter portion has a diameter less than that of the first diameter portion thereby providing an upward facing shoulder in the cap valve stem passage. The lower valve stem has a first diameter portion adjacent to the valve body midsection and a second diameter portion adjacent the first diameter portion. The second diameter portion has a diameter less than that of the first diameter portion thereby providing a downward facing shoulder on the lower valve stem. The second seal ring is carried between the upward facing shoulder in the cap valve stem passage and the downward facing shoulder on the lower valve stem and between the first diameter portion of the cap valve stem passage and the second diameter portion of the lower valve stem.

Still other embodiments provide such plug valves where the flow port of the valve body has a generally circular cross-section.

Further embodiments provide such plug valves where the plug valve is rated for at least 6,000 psi, or for at least 10,000 psi, or for at least 15,000 psi.

In other aspects and embodiments, the invention provides for plug valves for controlling flow through high-pressure fluid flow lines. The plug valves have a valve chamber, first and second seat inserts, and a rotatable valve body. The valve chamber has an undercut. The first and second valve seat inserts are mounted in the chamber undercut. The valve body has a midsection with a flow port. A passage extends between an upper surface and a lower surface of the midsection. An upper valve stem extends from the midsection upper surface, and a lower valve stem extends from the midsection lower surface. The upper surfaces of the valve body that are exposed to internal fluid pressure and lower surfaces of the valve body that are exposed to internal fluid pressure have substantially equal surface areas.

Other embodiments provide such plug valves where the plug valve has a first plug seal ring mounted around the upper valve stem and a second plug seal ring mounted around the lower valve stem. The diameter of the first and second plug seal rings are substantially equal.

In still other aspects and embodiments, the invention provides for fluid transportation systems, and especially fluid transportation systems for conveying frac fluid from a plurality of pumps to one or more wells. The fluid transportation systems comprise the plug valve of the subject invention.

In yet other aspects and embodiments, the subject invention provides for methods of controlling flow through fluid transportation systems, and especially, methods of controlling flow through a fluid transportation system conveying frac fluid from a plurality of pumps to one or more wells. The methods comprise installing the novel plug valves into a flow line in the fluid transportation system. The novel plug valves then are actuated to either allow flow through the flow line or to shut off flow through the flow line.

Finally, still other aspects and embodiments of the invention will have various combinations of such features as will be apparent to workers in the art.

Thus, the present invention in its various aspects and embodiments comprises a combination of features and characteristics that are directed to overcoming various shortcomings of the prior art. The various features and characteristics described above, as well as other features and characteristics, will be readily apparent to those skilled in the art upon reading the following detailed description of the preferred embodiments and by reference to the appended drawings.

Since the description and drawings that follow are directed to particular embodiments, however, they shall not be understood as limiting the scope of the invention. They are included to provide a better understanding of the invention and the way it may be practiced. The subject invention encompasses other embodiments consistent with the claims set forth herein.

Figure 1:
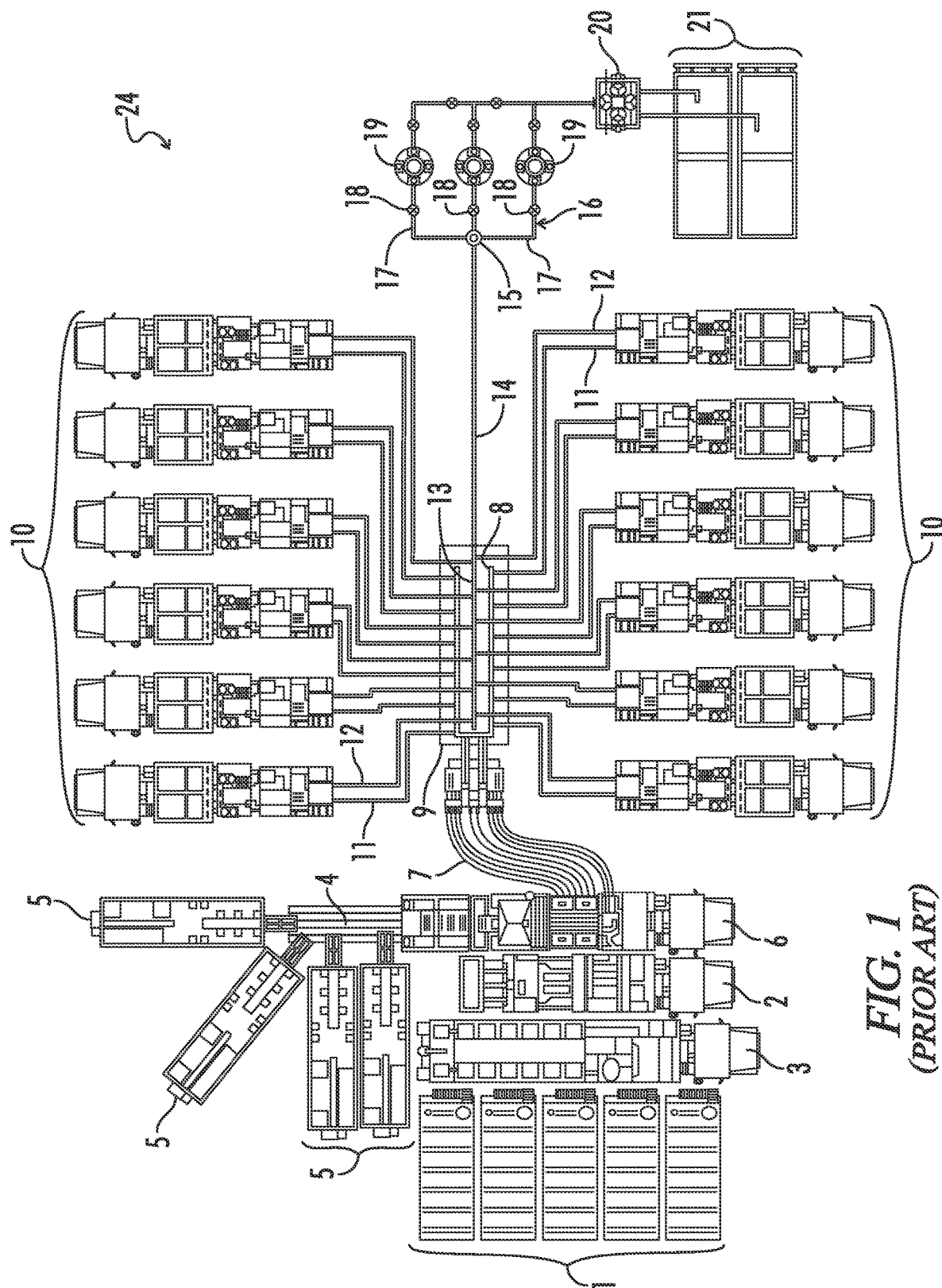
FIG. 1 (prior art) is a schematic view of a system 24 for fracturing a well and receiving flowback from the well, which system 24 includes a zipper manifold 16 that can selectively divert fluid into three well heads 19.

In the drawings and description that follows, like parts are identified by the same reference numerals. The drawing figures are not necessarily to scale. Certain features of the embodiments may be shown in exaggerated scale or in somewhat schematic form. Some details of conventional design and construction may not be shown in the interest of clarity and conciseness.

DESCRIPTION OF ILLUSTRATIVE EMBODIMENTS

The invention, in various aspects and embodiments, is directed generally to plug valves. More particularly, it provides plug valves that are designed to provide reliable flow control even when used in fluid transportation systems, such as systems for fracturing oil and gas wells, that convey abrasive and corrosive fluids at high pressures and flow rates. Some of those embodiments are described in some detail herein. For the sake of conciseness, however, all features of an actual implementation may not be described or illustrated. In developing any actual implementation, as in any engineering or design project, numerous implementation-specific decisions must be made to achieve a developers' specific goals. Decisions usually will be made consistent within system-related and business-related constraints, and specific goals may vary from one implementation to another. Development efforts might be complex and time consuming and may involve many aspects of design, fabrication, and manufacture. Nevertheless, it should be appreciated that such development projects would be a routine effort for those of ordinary skill having the benefit of this disclosure.

Broad embodiments of the novel plug valves may be used to control flow through high-pressure flow lines. The novel plug valves comprise a valve chamber having an undercut. First and second seat inserts are mounted in the chamber undercut. A rotatable valve body or "plug" is provided in the valve chamber. The plug has a flow port through a midsection. A passage extends between an upper surface and a lower surface of the plug. An upper valve stem extends from the midsection upper surface, and a lower valve stem extends from the midsection lower surface. The upper surfaces of the plug that are exposed to internal fluid pressure and the lower surfaces of the plug that are exposed to internal fluid pressure have substantially equal areas. As described further below, the novel combination of various features in the plug valves of the subject invention provide significant advantages.

The novel plug valves may be used in a variety of systems. They are particularly useful in high pressure flow lines as are common in chemical and other industrial plants, on marine dredging vessels, strip mines, and especially in the oil and gas industry. Certain embodiments are particularly well suited as components of temporary pipe and flow line installations. Hydraulic fracturing systems are a very common application where plug valves often are used.

A first preferred embodiment 30 of the novel plug valves is shown in FIGS. 2-10. Plug valve 30 may be used as a shut off valve in frac systems, such as frac system 24 shown in FIG. 1. For example, it may be used as valves 18 in zipper manifold 16 to selectively control flow to well heads 19. Plug valve 30 also may be used to selectively divert fluid from well heads 19 into flowback manifold 20 and elsewhere in frac system 24 where a conventional shut off valve would be used.

When plug valve 30 is assembled into a frac system it preferably will be rated for high pressures, that is, rated pressures of at least about 6,000 psi. For many frac jobs, it may have to be rated for pressures of 10,000 psi, 15,000 psi, or even 20,000 psi. Plug valve 30 and other embodiments of the novel plug valves, however, may be rated for low pressure service (from about 1,000 to about 2,000 psi) or for medium pressure service (from about 2,000 to about 6,000 psi) and used in lower pressure systems. It will be appreciated, however, that what is characterized as "low-pressure" in frac systems, is actually extremely high pressure as compared to many common fluid transportation systems, such as those that transport water.

Frac systems are intended for temporary use and will be assembled and disassembled at different well sites as needed. Thus, they are assembled on site from a large number of individual components and subassemblies of individual components. The components are known in the art as flow iron, frac iron, or ground iron. The frac iron components, including valves and other flow control devices, typically will be assembled with various types of unions. Unions allow the components to be connected ("made up") and disconnected ("broken down") relatively quickly, more quickly than threaded connections that may be preferred for permanent installations.

The three types of unions commonly used in frac systems are hammer (or "Weco®") unions, clamp (or "Greyloc®") unions, and flange unions. Though spoken of in terms that may imply they are discreet components, unions are actually interconnected subassemblies of the components joined by the union. One sub will be on one component, and a mating sub will be on the other. The subs then will be connected to each other to provide the union.

Figure 2:
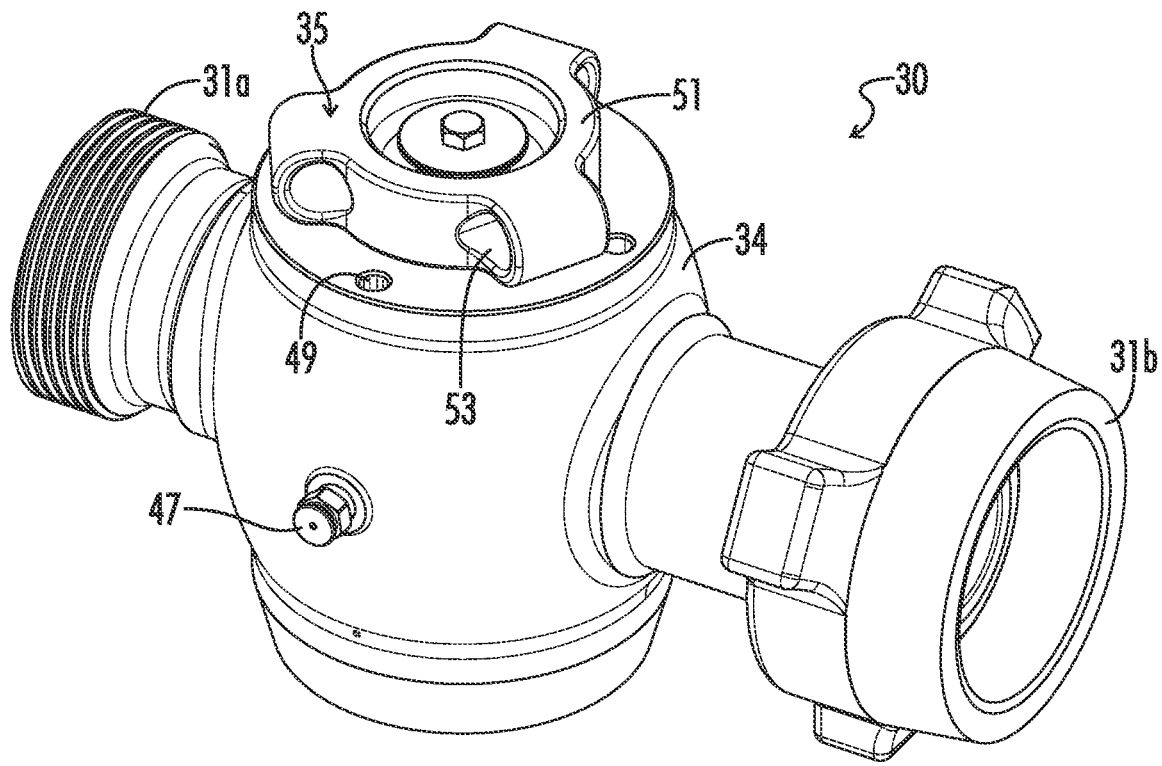
FIG. 2 is an isometric view of a first preferred embodiment 30 of a bottom-entry plug valve of the subject invention, plug valve 30 being right side up in the orientation in which it normally would be installed.
Figure 3:
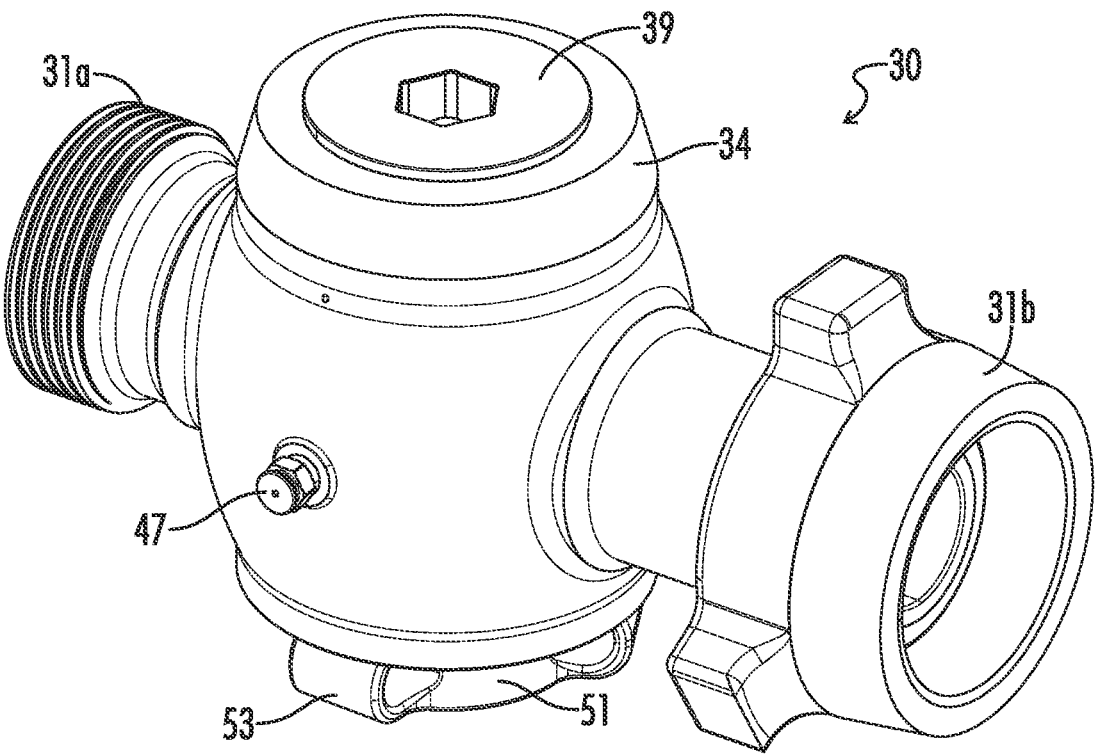
FIG. 3 is an isometric view of plug valve 30 shown upside down.

For example, as best appreciated from FIGS. 2-3, novel plug valve 30 is provided with hammer union subs. One end of plug valve 30 is provided with female hammer union sub 31a and the other end is provided with a male hammer union sub 31b. Hammer union subs 31 are of conventional design. Preferably, they are constructed as disclosed in U.S. Pat. No. 10,808,871 to D. Nguyen, but other conventional designs may be used. Likewise, if desired, the novel plug valves may be assembled into flow lines by conventional clamp or flange unions, by threaded connections, welding, or by other conventional methods and apparatus.

Figure 4:
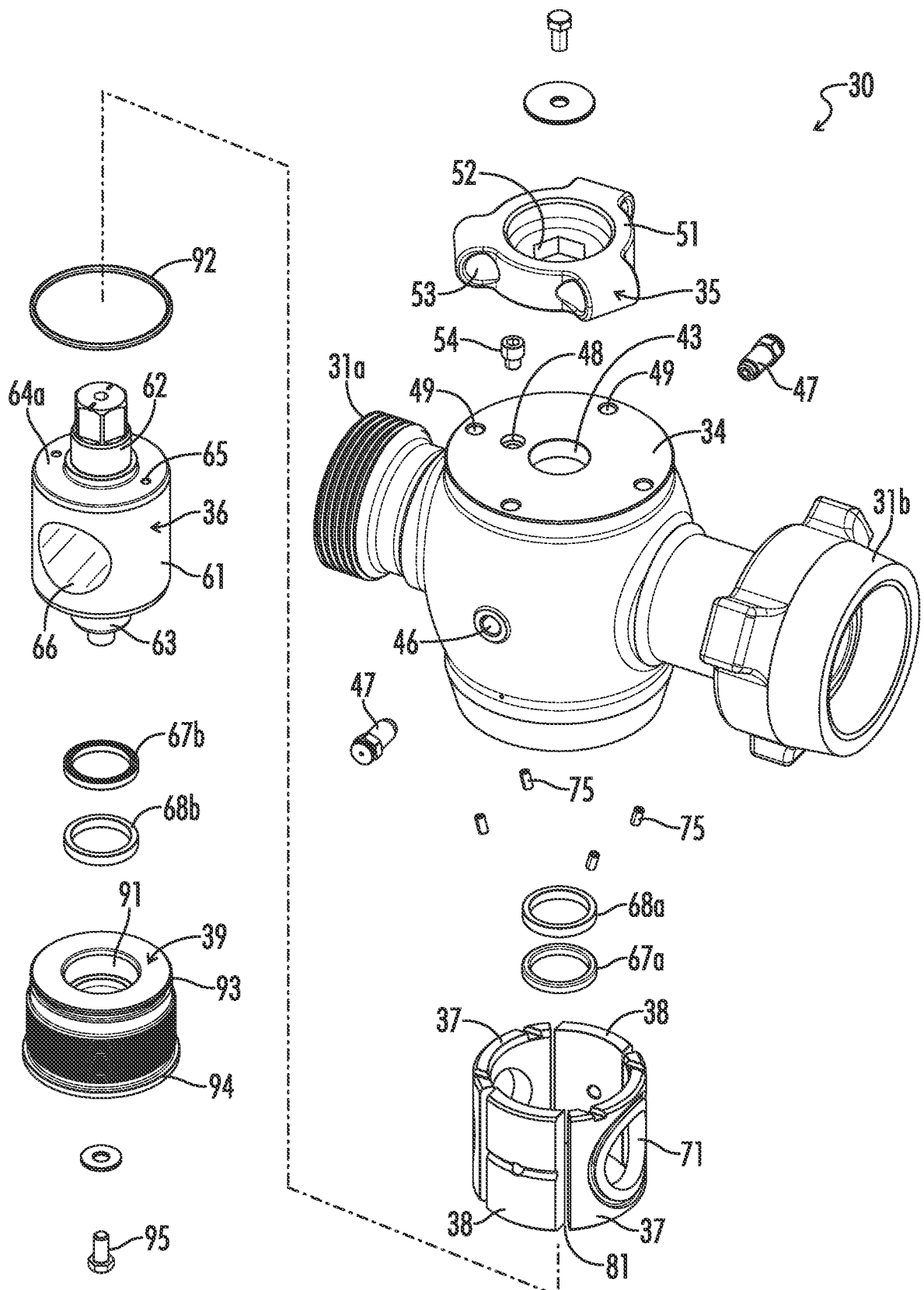
FIG. 4 is an exploded, isometric view of plug valve 30 shown in FIGS. 2-3 showing the components thereof.
Figure 5:
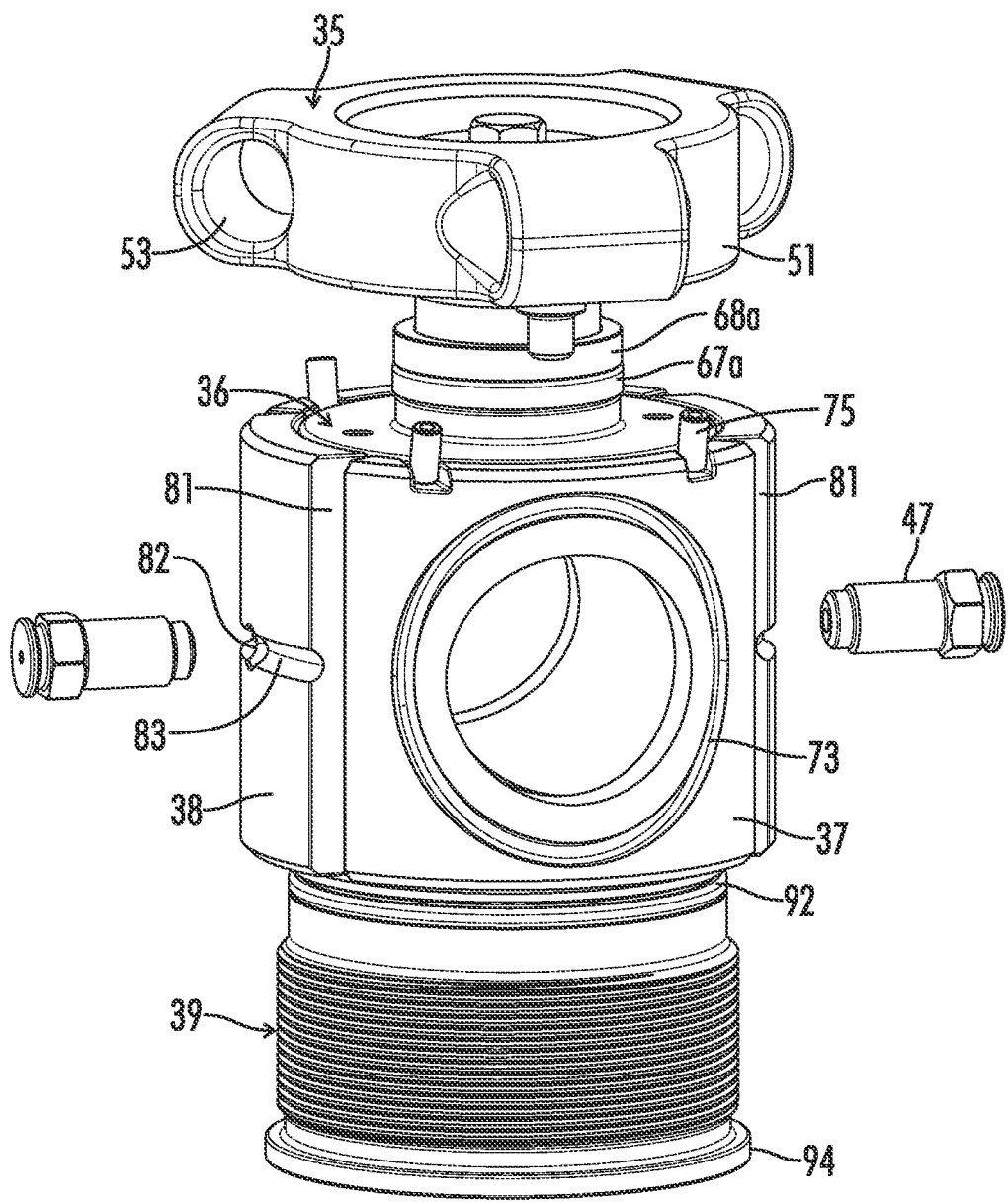
FIG. 5 is an isometric view of the internal components of plug valve 30.

As best appreciated from FIGS. 4-6, novel plug valve 30 generally comprises a valve housing 34, a handle assembly 35, a valve body, commonly referred to as the valve "plug" 36, a pair of seat inserts 37, a pair of filler inserts 38, and a cap 39. Housing 34 comprises the major portion of plug valve 30 and defines many of its features. It is the primary structure to which other flowline components will be connected, for example, through hammer union subs 31. It also provides the structure in or on which the other components of plug valve 30 will be assembled. Given that valve 30 preferably is designed for high-pressure applications, housing 34 will be fabricated with relatively thick walls from high-tensile material.

Figure 7:
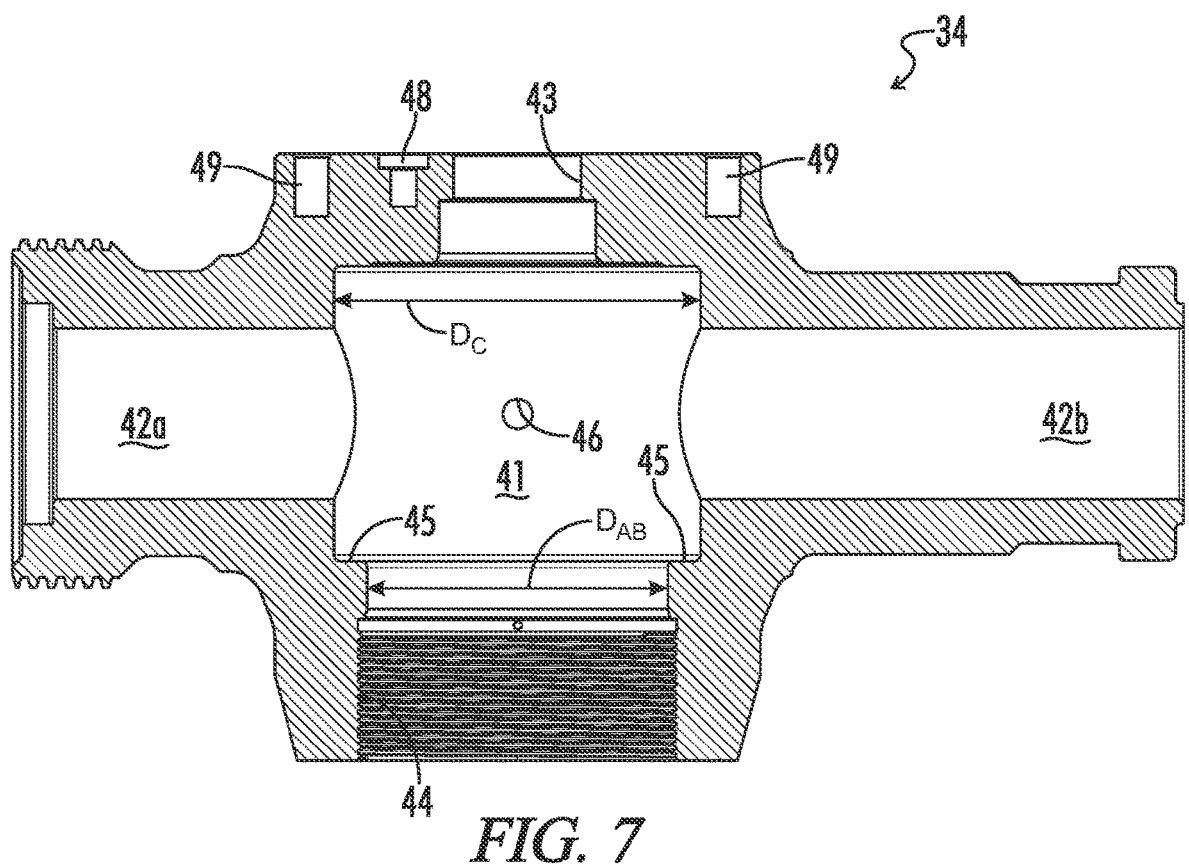
FIG. 7 is a cross-sectional view of a valve housing 34 of novel plug valve 30 in which other valve components have been removed.

In particular, as best appreciated from FIG. 7, housing 34 is configured to provide a generally cylindrical, central chamber 41 in which many of the internal components of plug valve 30 will be mounted. A first conduit 42a on one side of valve 30 provides an inlet into chamber 41. A second conduit 42b provides an outlet out of chamber 41. In that regard it will be appreciated that "inlet" and "outlet" are assigned arbitrarily for convenience. Fluid may flow in either direction through valve 30. Inlet 42a and outlet 42b, as is typical, are generally cylindrical and uniformly so, and usually will have a diameter generally equal to the flow line in which valve 30 is used. That will minimize pressure drop through valve 30. Conduits with other geometries may be used, however, if desired.

Housing 34 also provides a multi-diameter, but generally cylindrical valve stem passage 43 through which, as described further below, plug 36 will extend. A generally cylindrical access bore 44 extends downward from chamber 41. Again, as described further below, access bore 44 provides access to chamber 41 so that plug 36, seats 37, and fillers 38 may be mounted and replaced as necessary.

Figure 8:
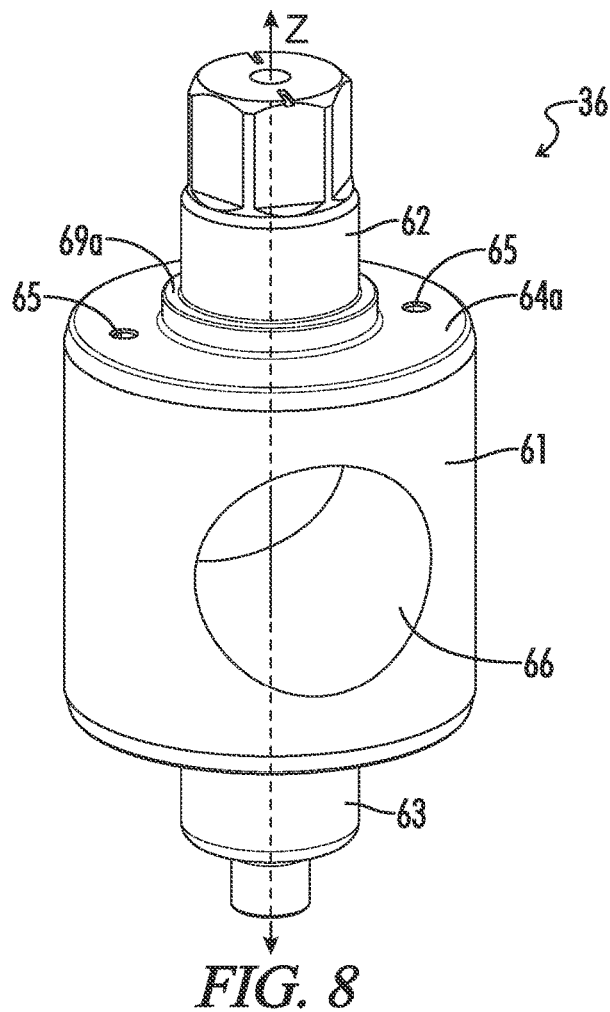
FIG. 8 is an isometric view of a valve body or "plug" 36 of novel plug valve 30.

As best appreciated from FIG. 8, valve stem passage 43, chamber 41, and access bore 44 all share a common, vertical, primary axis Z. It also will be appreciated that the diameter Dc of chamber 41 is greater than the diameter $D_{AB}$ of access bore 44. An annular undercut 45 is thus created in chamber 41. Undercut 45 extends radially beyond the axially inward portion of chamber 41 that is more or less equal in diameter to that of access bore 44.

Cap 39 is threaded into access bore 44. As best seen in FIGS. 4 and 6, cap 39 has a multi-diameter, but generally cylindrical valve stem passage 91 that accommodates, as described further below, plug 36. A main seal ring 92 is mounted in an annular gland 93 extending around an inner, unthreaded portion of cap 39. Main seal ring 92 is a radial pressure seal, such as an elastomer O-ring, that isolates internal fluid pressure. Other types of pressure seal rings, however, may be suitable. A short, annular rim 94 extends radially away from the outer surface of cap 39, thus providing a hard stop to threading of cap 39 into access bore 44.

The features of plug 36 are best appreciated from FIGS. 4 and 8. As may be seen therein, plug 36 has a generally cylindrical midsection 61, a multi-diameter, but generally cylindrical upper valve stem 62, and a multi-diameter, but generally cylindrical lower valve stem 63. The various diameters of upper valve stem 62 and lower valve stem 63 closely match, respectively, the various diameters of housing valve stem passage 43 and cap valve stem passage 91.

The extension of valve stems 62 and 63 above and below midsection 61 of plug 36 define annular upper and lower surfaces 64a/64b on midsection 61. Passages 65 extend axially through midsection 61 of plug 36 from upper annular surface 64a to lower annular surface 64b. A transverse passage, commonly referred to as a plug bore or flow port 66, extends through plug 36 perpendicular to primary axis Z. Flow port 66 generally is cylindrical, especially when valve 30 is designed for flows of abrasive fluids at high rates and pressure. A cylindrical port will allow more laminar flow through plug 36, thus reducing erosion. When sized to match inlet 42a and outlet 42b, and the diameter of the flow line in which valve 30 is mounted, pressure drop through plug valve 30 will be minimized. If desired, however, flow port 66 may have other cross-sections or various tapers and flares.

Figure 6A:
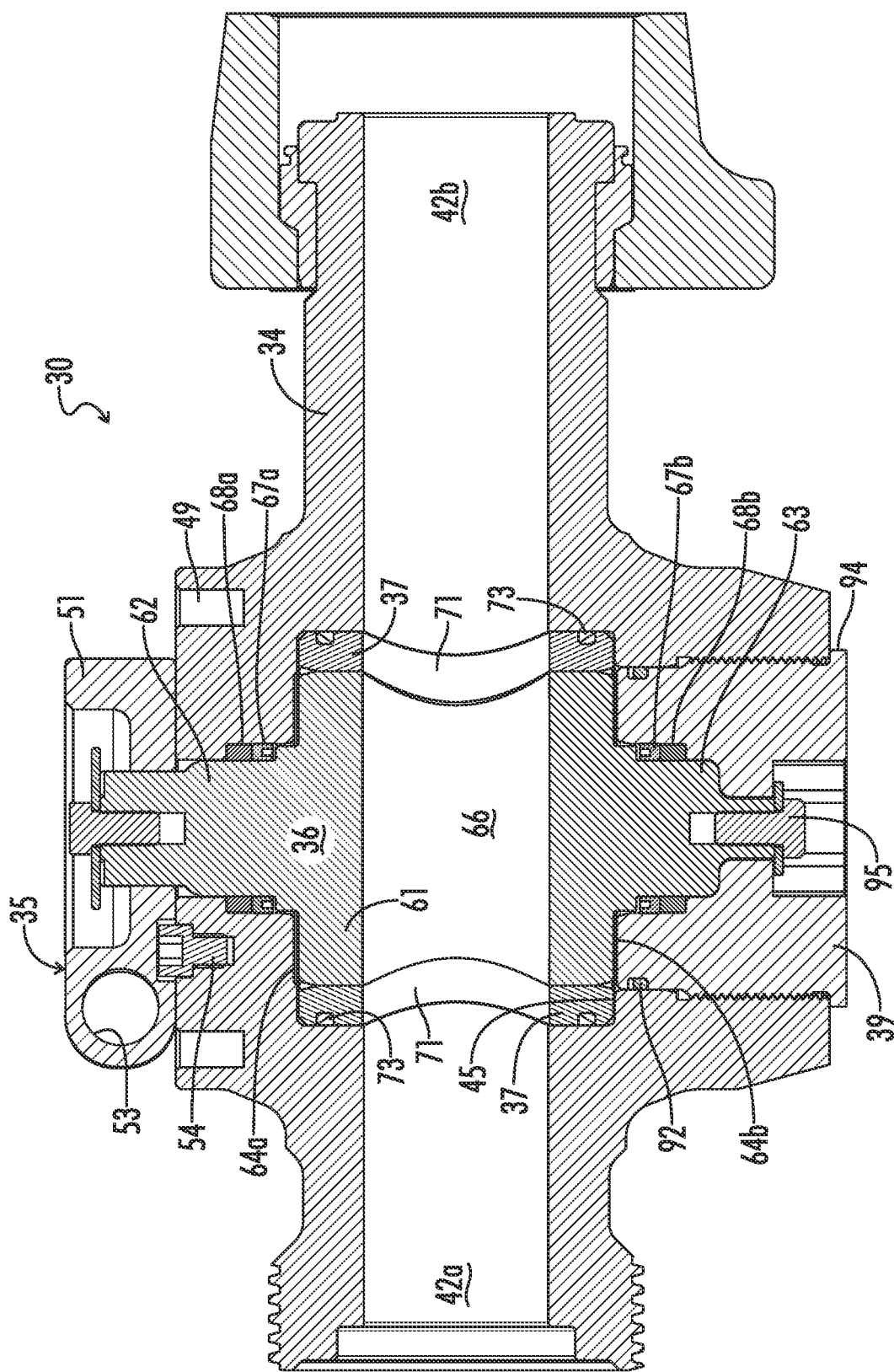
FIG. 6A is a cross-sectional view of plug valve 30 in its open state.
Figure 6B:
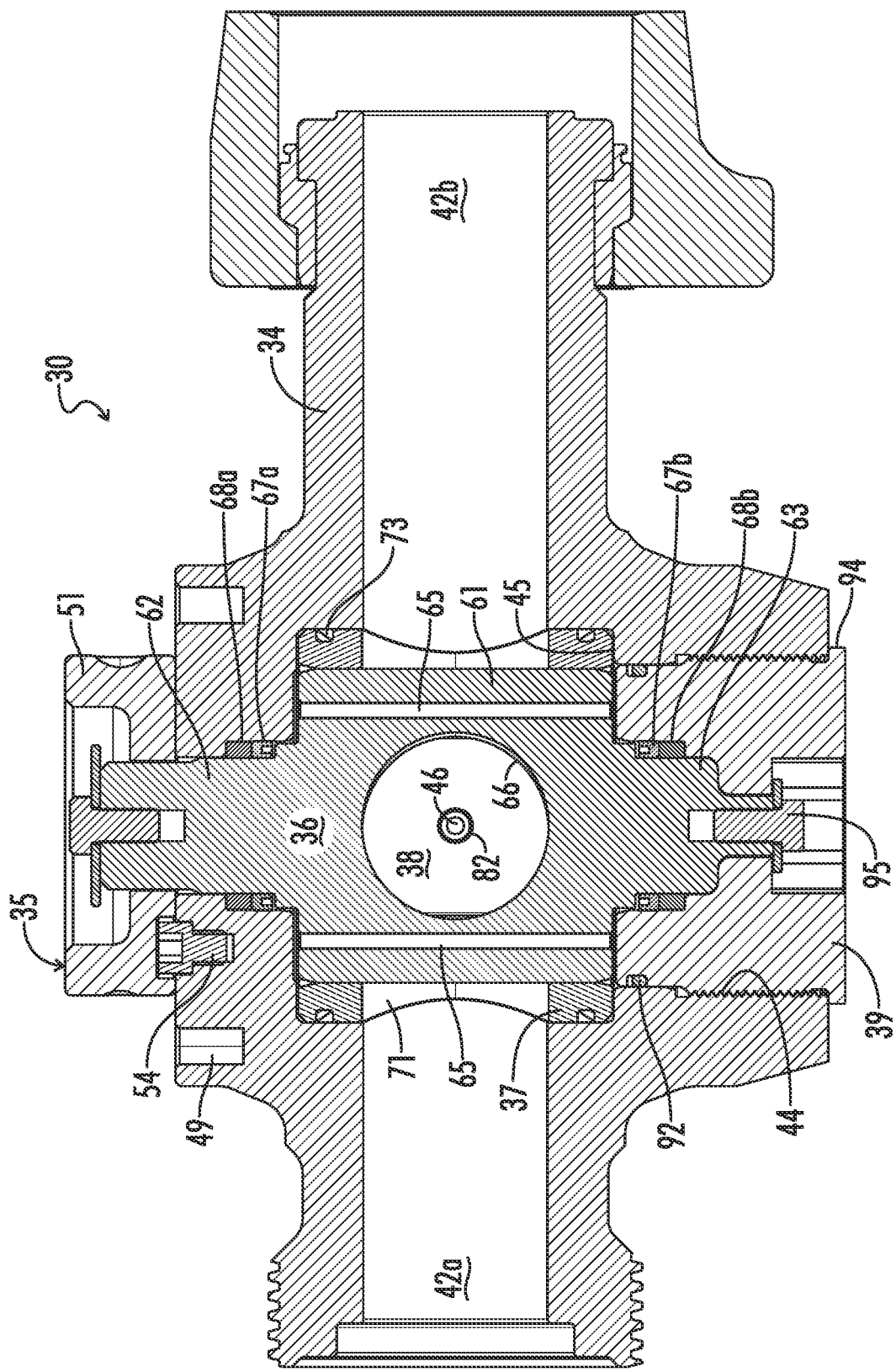
FIG. 6B is a cross-sectional view of plug valve 30 in its closed state.

Plug 36 is mounted for rotation about primary axis Z so that flow port 66 may be rotated into and out of alignment with inlet 42a and outlet 42b, as will be appreciated by comparing FIG. 6A (valve 30 in its open state) with FIG. 6B (valve 30 in its closed state). More particularly, midsection 61 of plug 36 is situated generally in chamber 41 radially inward of seats 37 and fillers 38. Upper valve stem 62 of plug 36 extends through valve stem passage 43 in housing 34. Lower valve stem 63 extends through valve stem passage 91 in access bore cap 39. Its terminus can extend slightly into a hexagonally shaped socket in the external surface of cap 39.

An adjustment bolt 95, carrying a flat washer, is threaded into an axial hole in the terminus of lower valve stem 63. The washer bears against the bottom surface of lower valve stem 63. Though not discernable in FIGS. 6, the slight extension of lower valve stem 63 into the hexagonal socket in cap 39 provides a small clearance between the washer and cap 39. That clearance allows plug 36 to rotate freely. Bolt 95 and its washer also limit axial movement of plug 36 within valve chamber 41. That in turn establishes proper clearances between plug 36 and chamber 41 and proper vertical alignment of flow port 66 with inlet 42a and outlet 42b when valve 30 is in its open state.

Plug 36 is provided with pressure seals to minimize, if not eliminate leakage of fluid through housing valve stem passage 43 and cap valve stem passage 91. For example, as may be seen in FIGS. 4-6, plug 36 may be provided with upper and lower plug seal rings 67a/67b. Plug seal rings 67a/67b preferably are radial, rotary pressure seal rings, such as elastomeric cup-style seal rings having an integral backup ring. Other types of seal rings may be used that not only provide a pressure seal, but tolerate rotation of plug 36. Backup rings preferably are provided to further minimize extrusion of plug seal rings 67a/67b, such as upper and lower plug seal backup rings 68a/68b. Plug seal rings 67a/67b and backup rings 68a/68b are mounted, respectively, between upper valve stem 62 and housing valve stem passage 43 and between lower valve stem 63 and cap valve stem passage 91.

More particularly, and as seen best in FIG. 8, upper valve stem 62 has a first diameter portion adjacent plug midsection 61 and a second diameter portion adjacent the first diameter portion. The second diameter portion has a diameter less than that of the first diameter portion, thus providing an upward facing shoulder 69a in upper valve stem 62. Housing valve stem passage 43, as seen best in FIG. 7, has a first diameter portion adjacent chamber 41 and a second diameter portion adjacent the first diameter portion. The second diameter portion has a diameter less than that of the first diameter portion, thus providing a downward facing annular shoulder in housing valve stem passage 43. Upper plug seal ring 67a and upper backup ring 68a are carried in the gland extending between upward facing shoulder in upper valve stem 62 and the downward facing shoulder in housing valve stem passage 43 and between the second diameter portion of upper valve stem 62 and the first diameter portion of housing valve stem passage 43.

Lower plug seal ring 67b and lower backup ring 68b are mounted between lower valve stem 63 and cap valve stem passage 91 in a similar fashion. That is, as seen best in FIGS. 6, lower valve stem 63 has a first diameter portion adjacent plug midsection 61 and a second diameter portion adjacent the first diameter portion. The second diameter portion has a diameter less than that of the first diameter portion, thus providing a downward facing shoulder 69b in lower valve stem 63. Cap valve stem passage 91, as appreciated from FIGS. 6, has a first diameter portion adjacent chamber 41 and a second diameter portion adjacent the first diameter portion. The second diameter portion has a diameter less than that of the first diameter portion, thus providing an upward facing annular shoulder in cap valve stem passage 91. Lower plug seal ring 67b and lower backup ring 68b are carried in the gland extending between downward facing shoulder in lower valve stem 63 and the upward facing shoulder in cap valve stem passage 91 and between the second diameter portion of lower valve stem 63 and the first diameter portion of cap valve stem passage 91.

Figure 9:
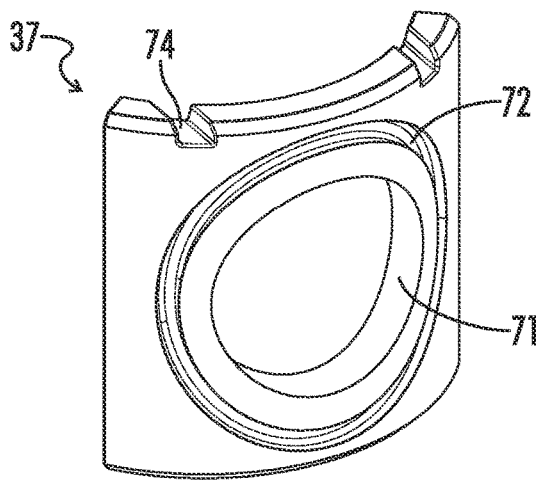
FIG. 9 is an isometric view of a seat insert 37 of novel plug valve 30.
Figure 10:
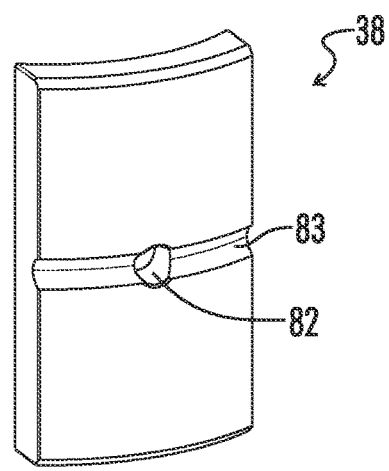
FIG. 10 is an isometric view of a filler insert 38 of novel plug valve 30.

Seat inserts 37, as best seen in FIGS. 4 and 9, have the general shape of a lateral segment of an open cylinder. A transverse passage 71 extends radially through seats 37. Seats 37 are mounted on either side of midsection 61 of plug 36. More specifically, they are mounted in undercut 45 of chamber 41 tightly abutting the circumference (vertical wall) of chamber 41. Passage 71 of one seat 37 aligns with inlet 42a and passage 71 of the other seat 37 aligns with outlet 42b. Thus, when plug 36 is rotated to an open position, its flow port 66 will align with inlet 42a and 42. Fluid will flow in inlet 42a, through passage 71 in inlet-side seat 37, flow port 66 of plug 36, and passage 71 in outlet-side seat 37, and out outlet 42b.

As their name implies, seats 37 provide a surface upon which midsection 61 of plug 36 may seat. More particularly, when plug 36 is rotated to a closed position, its flow port 66 will be perpendicular to and out of alignment with inlet 42a and outlet 42b. Fluid pressure on its inlet side will urge plug 36 against the outlet-side seat 37. A metal-to-metal seal will be formed between plug 36 and the inner face of outlet-side seat 37.

A pressure seal preferably is provided between seats 37 and chamber 41 to minimize leakage around the metal-to-metal seal established between seats 37 and plug 36. For example, as appreciated from FIGS. 6 and 9, seats 37 have an annular groove or gland 72 on their outer face. Gland 72 extends around passage 71. A radial pressure seal ring 73, such as an elastomer O-ring, is mounted in gland 72. Other types of pressure seal rings, however, may be suitable.

In addition, a mechanism preferably is provided to make it easier to position seats 37 in chamber 41 so that their passages 71 are properly aligned. For example, as will be appreciated from FIGS. 4, 5, and 9, seats 37 may be provided with notches 74 extending across their upper periphery. Pins 75 may be mounted within chamber 41, for example, by insertion into bottomed holes (not shown), such that pins 75 extend generally downward into undercut 45. Pins 75 are located such that when notches 74 pass around pins 75 as seats 37 are installed, passages 71 in seats 37 will be precisely aligned with inlet 42a and outlet 42b.

Filler inserts 38, like seats 37, have the general shape of a lateral segment of an open cylinder. They are mounted in undercut 45 of chamber 41 between seats 37 and on opposite sides of plug 36. When mounted, seats 37 and fillers 38 define collectively an open cylinder substantially occupying undercut 45. Preferably, as appreciated from FIGS. 4-5, fillers 38 are sized and positioned such that relatively narrow, vertical gaps 81 are left between them and seats 37.

Fillers in the novel plug valves eliminate areas in which debris may accumulate and preferably assist in distributing grease around the plug. For example, as seen best in FIG. 10, fillers 38 have a centrally located grease duct 82 extending radially from its outer face to its inner face. Grooves 83 provide grease channels that extend circumferentially across its outer face from radial duct 82 and terminate at the vertical edges of fillers 38.

As will be appreciated by comparing FIGS. 5, 6A, and 7, when fillers 38 are mounted in chamber 41, grease duct 82 will be generally aligned with grease ports 46 in valve housing 34. Grease thus may be pumped through grease ports 46, where it can flow toward plug 36 through filler ducts 82, along grooves 83 in fillers 38, and through vertical gaps 81 between fillers 38 and seats 37. Housing grease ports 46 are closed by grease injection fittings 47. Fittings 47 allow grease to flow into housing 34, but have a small check valve that prevents grease from flowing out of grease ports 46.

Handle assembly 35 is provided on the top side of valve 30. It generally comprises a handle 51 that is coupled to plug 36 and may be used to actuate valve 30. For example, as best seen in FIGS. 4 and 8, the terminus of upper valve stem 62 has a hexagonal cross-section. A hexagonally-shaped aperture 52 is provided in handle 51. Handle 51 may be slipped around and interlocked with the terminus of upper valve stem 62 as shown in FIGS. 5 and 6. Handle 51 is secured to upper valve stem 62, for example, by threading a washer-bolt assembly into a threaded hole in upper valve stem 62.

Handle 51 may be rotated, for example, by inserting a cheater bar (not shown) into one of three horizontally extending tubes 53 provided on the circumference of handle 51. Handle 51, and in turn plug 36, thus can be rotated from its open position to its closed position and vice versa. Handle assembly 35 also preferably has a mechanism to limit rotation of handle 51 so that plug 36 will be rotated precisely into and out of its open and closed positions. For example, an arcuate groove or track of approximately 90° is provided in the underside of handle 51. A pin 54 is threaded into a hole 48 in the upper surface of housing 34. When handle 51 is coupled with plug 36, pin 54 will extend into the arcuate groove in the underside of handle 51. Rotation of handle 51 is thus limited to 90°, and at either extreme, plug 36 will be precisely positioned.

Manually operated valves, such as valve 30 shown in the figures, are preferred by many service providers and operators because they are simple, reliable, and typically are the most inexpensive option for plug valves. It will be appreciated, however, that the novel valves may be provided with other types of manually operated actuators, or manually or automatically controlled powered actuators.

A geared wheel, for example, is a common type of actuator used for conventional plug valves and may be used with the novel valves. The gear train provides mechanical advantage in rotating the plug, an advantage that becomes more desirable as the size and pressure rating of the valve increases. Electro-mechanical, hydraulic, or pneumatic actuators are readily available and may be used with the novel plug valves. They may be controlled manually, for example, by a switch located near the valve or by a remote switch in a control booth or "doghouse." Such powered actuators also can be automatically controlled through conventional control systems, such as those based on printed logic circuits or digital computers. It will be noted that housing 34 of plug valve 30 is provided with threaded mounting holes 49 on its upper surface to allow other types of manual or powered actuators to be easily coupled to plug 36.

It will be appreciated that the novel combination of various features in the plug valves of the subject invention provide significant advantages. For example, undercut 45 provides in essence an annular pocket in chamber 45 of novel plug valve 30. Seals 37 and fillers 38 may be closely fitted and securely mounted therein. More significantly, however, undercut 45 provides better distribution of radial load generated by fluid pressure when valve 30 is in service, thus allowing a reduction in material and weight and providing more reliable pressure seals.

As best appreciated from FIGS. 6 and 7, other factors being equal, undercut 45 effectively reduces diameter $D_{AB}$ of access bore 44. Cap 39 and main seal 92, therefore, experience less axial load generated by fluid pressure in valve 30. That in turn allows a reduction in the amount of material in cap 39, as well as a reduction in the material in the portion of housing 34 that surrounds and defines access bore 44 and absorbs radial load from cap 39. Undercut 45 also effectively reduces the diameter of main seal 92. That in turn reduces the likelihood of leaks through main seal 92.

Moreover, pressure within novel plug valve 30 is better balanced and will reduce the degree of pressure locking when it is in its closed state and under pressure. For example, it will be appreciated that plug 36 is provided with both upper valve stem 62 and lower valve stem 63. Stems 62/63, as noted, define upper and lower annular surfaces 64 on plug midsection 61. As best appreciated from FIGS. 6 and 7, upper annular surface 64a and lower annular surface 64b have substantially equal surface areas. It also will be noted that upward facing shoulder 69a on upper valve stem 62 and downward facing shoulder 69b on lower valve stem 63 also have substantially equal surface areas. The same is true of upper plug seal ring 67a and lower plug seal ring 67b. Thus, the pressure load above and below plug 36 will be substantially equal.

Having said that, however, when plug valves are used in frac systems, the reality is that particulates in frac fluid transported through the valve over time tend to work themselves into clearances between the plug's internal components. As particulate matter builds up, the ideal balance of pressure load above and below plug 36 described above may no longer exist. Load imbalances above and below plug 36 can develop and can increase the forces contributing to pressure locking. Axial passages 65 in plug 36, however, provide additional flow paths through which pressure above and below plug 36 may equalize. The same is true for vertical gaps 81 between seats 37 and fillers 38. Thus, load imbalances above and below plug 36, even if particulates accumulate with valve 30, are less likely to develop and are less likely to exacerbate pressure locking.

The terms "upper" and "lower" and similar terms as used herein to describe location or orientation are relative to the most typical orientation of the novel plug valves when placed in service, that is, with the handle on top. "Axial," "radial," and forms thereof reference primary vertical axis of the plug, such as axis Z, about which the plug rotates. For example, axial movement or position refers to movements or positions generally along or parallel to the primary axis. "Radial" will refer to positions or movement toward or away from the primary axis.

In general, the novel plug valves may be fabricated from materials and by methods typically used in plug valves of this type and in frac iron generally. Given the extreme stress and the corrosive and abrasive fluids to which they may be exposed, especially those designed for high-pressure flow lines, suitable materials will be hard and strong. For example, excepting their seals and filler inserts, the components of novel plug valves may be fabricated from 4130 and 4140 chromoly steel or from somewhat harder, stronger steel such as 4130M7, high end nickel alloys, and stainless steel. The plug and seats preferably will be fabricated from stainless steel or the other harder steels. The components may be made by any number of conventional techniques, but typically and in large part will be made by forging, extruding, or mold casting a blank part and then machining the required features into the part.

Seals suitable for use in the novel plug valves are commercially available from many manufacturers. Suitable rotary pressure seals include, depending on the application, X-Pac® loaded U-cup seals (VT90 FKM (Viton) available from Martin Fluid Power Company, Inc. (MFP Seals) (www.mfpseals.com); urethane loaded lip seals available from Power Supply Components (powersupplyseals.com), and H2155 Hytrel®/N6014 NBR polyseals available from MFP Seals. Suitable static pressure seals include Viton, HNBR, and Buna O-rings available from Parker Hannifin Corp. (www.parker.com). Workers in the art will be able to select an appropriate seal and design a corresponding gland in accordance with conventional design criteria.

Backup rings also are commercially available from many manufacturers. They may be made of a hard material, such as steel, brass, and other metals, or from engineering plastics, such as polycarbonates, Nylon 6, Nylon 66, and other polyamides, including fiber reinforced polyamides such as Reny polyamide, polyether ether ketone (PEEK), and polyetherimides such as Ultem®.

Suitable filler inserts may be made of any relatively durable material, such as steel, brass, and other metals. Preferably, however, it will be made from durable, but less dense materials to reduce the overall weight of the valve. Such materials include those mentioned above for use in backup rings.

It will be appreciated that the novel plug valves have been exemplified as "two-way" valves. Plug valve 30 is considered a two-way valve because it is connected to two conduits, an inlet and an outlet. It either allows or shuts off flow through a single flow line. The novel plug valves, however, may be provided with additional conduits and may be adapted to control flow into or out of additional conduits. A "three-way" plug valve having an L-shaped flow port, for example, can shut off flow from a first conduit, or it can selectively divert flow from the first conduit into a second or a third conduit. Higher order plug valves will have more conduits and plugs with more elaborate or even multiple flow ports.

At the same time, it will be appreciated that given the highly abrasive and often corrosive nature of frac fluids, three-way and other higher order plug valves may not be well suited for and, thus, are not often used in frac systems. Turbulence through more complex flow ports likely will lead to unacceptable erosion. If a higher order plug valve does not operate at some point to shut off flow through all conduits, it also is unlikely to experience problems associated with pressure locking, even in high-pressure systems. Nevertheless, if desired, and especially if the fluids are relatively clean and non-reactive and there is a tendency for pressure locking, the novel plug valves may be provided with higher order operation by using conventional plug port designs and conduit connections.

Similarly, the novel plug valves have been exemplified as bottom-loading valves. That is, access bore 44 of valve 30 extends through the bottom of valve housing 34, that is, on the side opposite handle 51. Plug 36, seats 37, and fillers 38 are loaded into valve chamber 41 from the bottom. They may be switched out without removing handle assembly 35 or any actuators mounted on valve 30. If desired, however, the novel plug valves may be provided with an access bore on the top of the valve housing. A handle assembly or actuator necessarily will be mounted over the access bore cap. Rebuilding of the valve will be more complicated and time consuming. At the same time, a top-loading design can allow additional reductions in the amount of material used in the valve housing with attendant cost savings.

Finally, plug valve 30 has been exemplified in the context of frac systems, such as frac system 24 shown in FIG. 1. It has been exemplified specifically as installed in flow lines 17 of zipper manifold 16 and as used to selectively divert flow into zipper flow lines 17. The novel plug valves, however, may be used elsewhere in conventional frac systems, for example, in flowback manifold 20 of frac system 24. Although particularly designed for use on the high-pressure side of frac systems, they may find use in the low-pressure side as well. Likewise, the novel plug valves may be used in other conventional fluid transportation systems, whether temporary or permanent, especially when abrasive or corrosive liquids will be transported at high pressure or high flow rates.

While this invention has been disclosed and discussed primarily in terms of specific embodiments thereof, it is not intended to be limited thereto. Other modifications and embodiments will be apparent to the worker in the art.

What is claimed is:

1. A plug valve adapted for controlling flow through high-pressure fluid flow lines, said plug valve comprising:
    (a) a housing adapted for assembly into a high-pressure flow line, said housing comprising:
        i) first and second conduits;
        ii) a generally cylindrical valve stem passage;
        iii) a generally cylindrical access bore having a diameter; and
        iv) a generally cylindrical chamber, said chamber:
            (1) communicating with said first and second conduits, said housing valve stem passage, and said access bore; said chamber:
            (2) being generally aligned axially with said housing valve stem passage and said access bore; and
            (3) having a diameter greater than said diameter of said access bore, thereby providing an annular undercut in said chamber;
    (b) a cap threaded into said access bore, said cap having:
        i) a valve stem passage; and
        ii) a main seal ring mounted between said cap and said access bore, said main seal ring having a diameter less that said diameter of said chamber;
    (c) first and second seat inserts, each said seat insert:
        i) having the general shape of a lateral segment of an open cylinder;
        ii) having a transverse passage; and
        iii) being mounted in said undercut of said chamber such that said transverse passage of said first seat insert aligns with said first conduit and said transverse passage of said second seat insert aligns with said second conduit;
    (d) a valve body, said valve body:
        i) being mounted in said housing valve stem passage, said chamber, and said cap valve stem passage for rotation about a primary axis;
        ii) having a generally cylindrical midsection, said midsection:
            (1) being adapted to seat on said seat inserts;
            (2) having an upper annular surface and a lower annular surface; and
            (3) having a passage extending axially through said midsection from said upper annular surface to said lower annular surface, said passage allowing equalization of fluid pressure above and below said midsection;
            (4) wherein said upper annular surface of said valve body and said lower annular surface of said valve body have substantially equal surface areas;
        iii) having an upper valve stem extending through said housing valve stem passage;
        iv) having a lower valve stem extending through said cap valve stem passage;
        v) a first plug seal ring mounted between said upper valve stem and said housing valve stein passage and having a diameter; and
        vi) a second plug seal ring mounted between said lower valve stem and said cap valve stem passage and, having a diameter substantially equal to said diameter of said first plug seal ring; and
        vii) having a flow port through said midsection; wherein said flow port:
            (1) aligns with said seat insert passages and said conduits to allow flow through said valve when said valve body is rotated to an open position; and
            (2) is out of alignment with said seat insert passages and said conduits to shut off flow through said valve when said valve body is rotated to a closed position.

2. The plug valve of claim 1, wherein:
    (a) said plug valve comprises at least two filler inserts, each said filler insert:
        i) having the general shape of a lateral segment of an open cylinder; and
        ii) being mounted in said undercut of said chamber between said first and second seat inserts; and
    (b) said seat inserts and said filler inserts collectively define an open cylinder substantially occupying said chamber undercut.

3. The plug valve of claim 2, wherein said filler inserts, when mounted in said undercut of said chamber along with said first and second seat inserts, provide vertical gaps between said filler inserts and said seat inserts.

4. The plug valve of claim 2, wherein at least one of said filler inserts has:
    (a) a hole extending radially through said filler insert; and
    (b) a groove on an outer face thereof, said groove extending at least from a point proximate a grease port in said housing to a point proximate an edge of a said seat insert.

5. A fluid transportation system for conveying frac fluid from a plurality of pumps to one or more wells, said fluid transportation system comprising the plug valve of claim 2.

6. The plug valve of claim 1, wherein said plug valve comprises first and second seat seal rings extending around said transverse passages in said seat inserts and mounted between an outer face of said seat inserts and a circumference of said chamber.

7. The plug valve of claim 1, wherein said plug valve comprise a mechanism for positioning said seat inserts in said undercut of said chamber such that their respective said transverse passages align with said conduits.

8. The plug valve of claim 7, wherein said plug valve comprises pins mounted in said undercut of said chamber and said seat inserts comprise peripheral notches adapted to accommodate said pins, said pins and notches being located so as to align said transverse passages of said seat inserts with said conduits when said seat inserts are mounted in said undercut of said chamber.

9. The plug valve of claim 1, wherein said main seal ring is mounted in an annular gland provided, in an unthreaded portion of said cap.

10. The plug valve of claim 1, wherein:
(a) said housing valve stem passage has a first diameter portion adjacent said chamber and a second diameter portion adjacent said first diameter portion, wherein said second diameter portion has a diameter less than that of said first diameter portion thereby providing a downward facing annular shoulder in said housing valve stem passage;
(b) said upper valve stem has a first diameter portion adjacent said valve body midsection and a second diameter portion adjacent said first diameter portion, wherein said second diameter portion has a diameter less than that of said first diameter portion thereby providing an upward facing shoulder on said upper valve stem;
(c) said first seal ring is carried between said downward facing shoulder in said housing valve stem passage and said upward facing shoulder on said upper valve stem passage and between said first diameter portion of said housing valve stem passage and said second diameter portion of said upper valve stem;
(d) said cap valve stem passage has a first diameter portion adjacent said chamber and a second diameter portion adjacent said first diameter portion, wherein said second diameter portion has a diameter less than that of said first diameter portion thereby providing an upward facing shoulder in said cap valve stem passage;
(e) said lower valve stem has a first diameter portion adjacent said valve body midsection and a second diameter portion adjacent said first diameter portion, wherein said second diameter portion has a diameter less than that of said first diameter portion thereby providing a downward facing shoulder on said lower valve stein; and
(f) said second seal ring is carried between said upward facing shoulder in said cap valve stem passage and said downward facing shoulder on said lower valve stem and between said first diameter portion of said cap valve stem passage and said second diameter portion of said lower valve stem.

11. The plug valve of claim 1, wherein said plug valve is rated for at least 6,000 psi.

12. The plug valve of claim 1, wherein said plug valve is rated for at least 10,000 psi.

13. The plug valve of claim 1, wherein said plug valve is rated for at least 15,000 psi.

14. A fluid transportation system for conveying frac fluid from a plurality of pumps to one or more wells, said fluid transportation system comprising the plug valve of claim 1.

15. A method of controlling flow through a fluid transportation system conveying frac fluid from a plurality of pumps to one or more wells, said method comprising:
(a) installing the plug valve of claim 1 in a flow line in said fluid transportation system; and
(b) actuating said plug valve to allow flow through said flow line and to shut off flow through said flow line.

16. A plug valve adapted for controlling flow through high-pressure fluid flow lines, said plug valve comprising:
(a) a valve chamber, said chamber having an undercut;
(b) first and second valve seat inserts mounted in said chamber undercut;
(c) a rotatable valve, body, said valve body comprising:
i) a midsection;
ii) a flow port extending through said midsection;
iii) a passage extending between an upper surface and a lower surface of said midsection;
iv) an upper valve stem extending from said midsection upper surface; and
v) a lower valve stem extending from said, midsection lower surface;
vi) wherein the upper surfaces of said valve body exposed to internal fluid pressure and lower surfaces of said valve body exposed to internal fluid pressure have substantially equal surface areas.

17. The plug valve of claim 16, wherein said plug valve comprises:
(a) a first plug seal ring mounted around said upper valve stem and having a diameter; and
(b) a second plug seal ring mounted around said lower valve stem and having a diameter substantially equal to said diameter of said first plug seal ring.

18. A fluid transportation system for conveying frac fluid from a plurality of pumps to one or more wells, said fluid transportation system comprising the plug valve of claim 17.

19. A fluid transportation system for conveying frac fluid from a plurality of pumps to one or more wells, said fluid transportation system comprising the plug valve of claim 16.

20. A method of controlling flow through a fluid transportation system conveying frac fluid from a plurality of pumps to one or more wells, said method comprising:
(a) installing the plug valve of claim 16 in a flow line in said fluid transportation system; and
(b) actuating said plug valve to allow flow through said flow line and to shut off flow through said flow line.

21. The plug valve of claim 16, wherein:
(a) said plug valve comprises at least two filler inserts, each said filler insert:
i) having the general shape of a lateral segment of an open cylinder; and
ii) being mounted in said undercut of said chamber between said first and second seat inserts; and
(b) said seat inserts and said filler inserts collectively define an open cylinder substantially occupying said chamber undercut.

22. The plug valve of claim 21, wherein said filler inserts, when mounted in said undercut of said chamber along with said first and second seat inserts, provide vertical gaps between said filler inserts and said seat inserts.

23. The plug valve of claim 21, wherein at least one of said filler inserts has:
(a) a hole extending radially through said filler insert; and (b) a groove on an outer face thereof, said groove extending at least from a point proximate a grease port in said housing to a point proximate an edge of a said seat insert.

24. The plug valve of claim 16, wherein said plug valve is rated for at least 6,000 psi.

25. The plug valve of claim 16, wherein said plug valve is rated for at least 10,000 psi.

26. The plug valve of claim 16, wherein said plug valve is rated for at least 15,000 psi.

\* \* \* \* \*

UNITED STATES PATENT AND TRADEMARK OFFICE
CERTIFICATE OF CORRECTION

PATENT NO. : 11,920,451 B1
APPLICATION NO. : 18/126922
DATED : March 5, 2024
INVENTOR(S) : Duy D. Nguyen It is certified that error appears in the above-identified patent and that said Letters Patent is hereby corrected as shown below:

In the Claims

In Claim 1, at Column 16, Line 29, after "valve stem and said housing valve," delete "stein", and insert therein, -- stem --.

In Claim 10, at Column 17, Line 38, before "and between said first diameter portion of said," delete "passage".

Signed and Sealed this
Second Day of April, 2024

Katherine Kelly Vidal
*Director of the United States Patent and Trademark Office*